(12) United States Patent
Jiang

(10) Patent No.: US 9,088,607 B2
(45) Date of Patent: Jul. 21, 2015

(54) METHOD, DEVICE, AND SYSTEM FOR NETWORK ATTACK PROTECTION

(75) Inventor: Wu Jiang, Beijing (CN)

(73) Assignee: Huawei Digital Technologies (Cheng Du) Co., Limited, Chengdu (CN)

( * ) Notice: Subject to any disclaimer, the term of this patent is extended or adjusted under 35 U.S.C. 154(b) by 351 days.

(21) Appl. No.: 13/488,128

(22) Filed: Jun. 4, 2012

(65) Prior Publication Data

US 2012/0254977 A1    Oct. 4, 2012

Related U.S. Application Data

(63) Continuation of application No. PCT/CN2010/079127, filed on Nov. 25, 2010.

(30) Foreign Application Priority Data

Dec. 28, 2009    (CN) .......................... 2009 1 0261712

(51) Int. Cl.
*H04L 29/06* (2006.01)

(52) U.S. Cl.
CPC ......... *H04L 63/1458* (2013.01); *H04L 63/0236* (2013.01); *H04L 63/0263* (2013.01); *H04L 2463/146* (2013.01)

(58) Field of Classification Search
CPC .............. H04L 45/00; H04L 2463/146; H04L 63/0236; H04L 63/0263; H04L 63/1408; H04L 63/1458
USPC ...................................................... 726/11–13
See application file for complete search history.

(56) References Cited

U.S. PATENT DOCUMENTS

| 6,397,260 | B1 * | 5/2002 | Wils et al. ..................... 709/238 |
| 6,513,122 | B1 * | 1/2003 | Magdych et al. ............... 726/23 |

(Continued)

FOREIGN PATENT DOCUMENTS

| CN | 1777182 A | 5/2006 |
| CN | 1917514 A | 2/2007 |

(Continued)

OTHER PUBLICATIONS

1st Office Action in corresponding Chinese Patent Application No. 200910261712.8 (Feb. 17, 2013).

(Continued)

*Primary Examiner* — Catherine Thiaw
(74) *Attorney, Agent, or Firm* — Leydig, Voit & Mayer, Ltd.

(57) ABSTRACT

The present invention discloses a method for network attack protection, a device, and a system thereof. The method includes: receiving information about attack source, in which the information about the attack source carries address information about an attacker; obtaining address information about a gateway corresponding to the attacker according to the address information about the attacker and a preset mapping relationship between the attacker and the gateway corresponding to the attacker; and sending a first control message to the gateway corresponding to the attacker according to the address information about the gateway corresponding to the attacker, wherein the first control message instructs the gateway corresponding to the attacker to control traffic of the attacker. The present invention may be used on a communications network to prevent the attacker from attacking victim hosts on the network from the root, avoid blockage on the upstream network of the victim hosts.

13 Claims, 6 Drawing Sheets

(56) References Cited

U.S. PATENT DOCUMENTS

| | | | |
|---|---|---|---|
| 6,944,673 B2* | 9/2005 | Malan et al. | 709/237 |
| 7,062,782 B1* | 6/2006 | Stone et al. | 726/22 |
| 7,356,689 B2* | 4/2008 | Burch et al. | 713/153 |
| 7,921,460 B1* | 4/2011 | Callon et al. | 726/22 |
| 8,108,554 B1* | 1/2012 | Masters | 709/245 |
| 2002/0032854 A1* | 3/2002 | Chen et al. | 713/151 |
| 2002/0035698 A1* | 3/2002 | Malan et al. | 713/201 |
| 2003/0084327 A1* | 5/2003 | Lingafelt et al. | 713/200 |
| 2005/0018618 A1* | 1/2005 | Mualem et al. | 370/252 |
| 2005/0131946 A1* | 6/2005 | Korn et al. | 707/104.1 |
| 2005/0144467 A1* | 6/2005 | Yamazaki | 713/189 |
| 2006/0156402 A1* | 7/2006 | Stone et al. | 726/22 |
| 2006/0236401 A1* | 10/2006 | Fosdick | 726/25 |
| 2006/0248588 A1* | 11/2006 | Jayaraman | 726/22 |
| 2006/0282893 A1 | 12/2006 | Wu et al. | |
| 2007/0064697 A1* | 3/2007 | Nesbitt et al. | 370/392 |
| 2008/0052774 A1* | 2/2008 | Chesla et al. | 726/13 |
| 2008/0127324 A1* | 5/2008 | Seo et al. | 726/13 |
| 2009/0260083 A1* | 10/2009 | Szeto et al. | 726/22 |
| 2009/0290590 A1* | 11/2009 | Phadnis et al. | 370/401 |
| 2009/0320120 A1* | 12/2009 | Osborne et al. | 726/12 |
| 2010/0082758 A1* | 4/2010 | Golan | 709/206 |
| 2010/0218250 A1* | 8/2010 | Mori et al. | 726/22 |

FOREIGN PATENT DOCUMENTS

| | | | | |
|---|---|---|---|---|
| CN | 101247217 A | 8/2008 | | |
| CN | 101309150 A | 11/2008 | | |
| CN | 101453389 A | 6/2009 | | |
| CN | 101572700 A | 11/2009 | | |
| JP | WO2009041686 | * | 4/2009 | H04L 12/56 |

OTHER PUBLICATIONS

Written Opinion of the International Searching Authority in corresponding International Patent Application No. PCT/CN2010/079127 (Mar. 10, 2011).

International Search Report in corresponding International Patent Application No. PCT/CN2010/079127 (Mar. 10, 2011).

Mirkovic, "D-Ward: Source-End Defense Against Distributed Denial-of-Service Attacks," Doctoral Dissertation, Aug. 2003, University of California, Los Angeles, California.

Zhang et al., "Identifying and Tracebacking Short Message Spam," Application Research of Computers, Mar. 2006, No. 3, China Academic Journal Publishing House, Beijing, China.

* cited by examiner

METHOD, DEVICE, AND SYSTEM FOR NETWORK ATTACK PROTECTION

CROSS-REFERENCE TO RELATED APPLICATIONS

This application is a continuation of International Application No. PCT/CN2010/079127, filed on Nov. 25, 2010, which claims priority to Chinese Patent Application No. 200910261712.8, filed on Dec. 28, 2009, both of which are hereby incorporated by reference in their entireties.

FIELD OF THE INVENTION

The present invention relates to a network security technology field, and in particular, to a method, device, and system for network attack protection.

BACKGROUND OF THE INVENTION

Distribution denial of service (DDOS, Distribution Denial Of Service) attacks are a type of network attack behavior in which an attacker uses a controller as a springboard to control a large number of infected and controlled attackers which form an attacker network for launching large-scale denial-of-service attacks on victim hosts. Distributed denial of service attacks use an attacker network to initiate a large number of service request packets to victim hosts so that the victim hosts are busy in handling these bursting requests and cannot respond normally to legal user requests. As a result, the victim hosts break down.

A prior art proposes a method for network attack protection by using a DDOS cleaning device for cleaning service requests. This method detects network attack behavior by using an attack detection device. After network attacks are found, a DDOS cleaning device is notified. The DDOS cleaning device sends an instruction to a router for sending all packets of the destination server (that is, the victim host) through the router to the DDOS cleaning device. After cleaning the packets, the DDOS cleaning device returns the packets to the router for the router to send the cleaned data to the destination server.

During research on the prior art, the inventor finds that the method for network attack protection according to the prior art protects mainly the victim hosts, and performs cleaning only when a large flow of DDOS attacks reaches the victim hosts. By that time, however, the large flow of DDOS attacks already blocks the upstream network of the victim hosts, wasting network bandwidth.

SUMMARY OF THE INVENTION

The present invention provides a method, device, and system for network attack protection which prevent an upstream network of a victim host from being blocked.

An embodiment of the present invention provides a method for network attack protection. The method includes: receiving information about an attack source, in which the information about the attack source carries address information about an attacker; obtaining address information about a gateway corresponding to the attacker according to the address information about the attacker and a preset mapping relationship between the attacker and the gateway corresponding to the attacker; and sending a first control message to the gateway corresponding to the attacker according to the address information about the gateway corresponding to the attacker, in which the first control message instructs the gateway corresponding to the attacker to control traffic of the attacker.

An embodiment of the present invention provides another method for network attack protection. The method includes: receiving information about an attack source, in which the information about the attack source carries address information about an attacker; obtaining address information about a controller on an attacker network to which the attacker belongs according to the address information about the attacker; obtaining address information about a gateway corresponding to the controller according to the address information of the controller and a preset mapping relationship between the controller and the gateway corresponding to the controller; and sending a second control message to the gateway corresponding to the controller according to the address information about the gateway corresponding to the controller, in which the second control message instructs the gateway corresponding to the controller to control traffic of the controller.

An embodiment of the present invention provides a device for network attack protection. The device includes: a receiving unit configured to receive information about an attack source, in which the information about the attack source carries address information about an attacker; a first obtaining unit configured to obtain address information about a gateway corresponding to the attacker according to the address information about the attacker and a preset mapping relationship between the attacker and the gateway corresponding to the attacker; and a processing unit configured to send a first control message to the gateway corresponding to the attacker according to the address information about the gateway corresponding to the attacker, in which the first control message instructs the gateway corresponding to the attacker to control traffic of the attacker.

An embodiment of the present invention provides another device for network attack protection. The device includes: a receiving module configured to receive information about an attack source, in which the information about the attack source carries address information about an attacker; a first obtaining module configured to obtain address information about a controller on an attacker network to which the attacker belongs according to the address information about the attacker received by the receiving module; a second obtaining module configured to obtain address information about a gateway corresponding to the controller according to the address information about the controller and a preset mapping relationship between the controller and the gateway corresponding to the controller; and a processing module configured to send a second control message to the gateway corresponding to the controller according to the address information about the gateway corresponding to the controller, in which the second control message instructs the gateway corresponding to the controller to control traffic of the controller.

An embodiment of the present invention provides a system for network attack protection. The system includes a device for detecting a network attack, a device for network attack protection, a device for monitoring an attacker network, and a gateway, in which: the device for detecting a network attack is configured to detect an attack source on a network and send information about the attack source to the device for network attack protection, in which the information about the attack source carries address information about an attacker; the device for network attack protection is configured to receive the information about the attack source sent by the device for detecting a network attack, query the device for monitoring a network attack for address information about a controller on an attacker network to which the attacker belongs according to the information about the attack source, obtain address information about the gateway, which corresponds to the controller, according to the address information about the controller and a preset mapping relationship between the controller and the gateway, and send a control message to the gateway corresponding to the controller according to the address information about the gateway corresponding to the controller, in which the control message instructs the gateway corresponding to the controller to control traffic of the controller; the device for monitoring an attacker network is configured to receive a query request sent by the device for network attack protection, in which the query request carries the address information about the attacker, and return the address information about the controller on the attacker network to which the attacker belongs to the device for network attack protection; and the gateway is configured to receive the control message sent by the device for network attack protection and control the traffic of the controller according to the control message.

In the embodiments of the present invention, sending the first control message to the gateway corresponding to the attacker may allow the gateway to control the traffic of the attacker according to the message and prohibit the attacker from receiving or sending data, thereby preventing the attacker from attacking victim hosts on the network from the root, avoiding blockage on the upstream network of the victim hosts, saving network resources, and improving utilization efficiency of the network.

BRIEF DESCRIPTION OF THE DRAWINGS

To better illustrate the present invention or technical solution, the drawings that need to be used in the present invention are presented in embodiments of the present invention. It is understandable that the drawings merely provide several applications of the present invention. Those skilled in the art can obtain other drawings based on these drawings without innovative efforts.

DETAILED DESCRIPTION OF THE EMBODIMENTS

The following describes the technical solutions of the embodiments of the present invention with reference to the accompanying drawings. Evidently, the embodiments described below are covering part of, but not all of the embodiments of the present invention. All the other embodiments obtained by those skilled in the art without creative efforts based on the embodiments of the present invention fall within the protection scope of the present invention.

The present invention provides a method for network attack protection and a device and system for implementing the method. To help better understand the technical solutions in the embodiments of the present invention, the following describes the embodiments of the present invention with the help of drawings.

Figure 1:
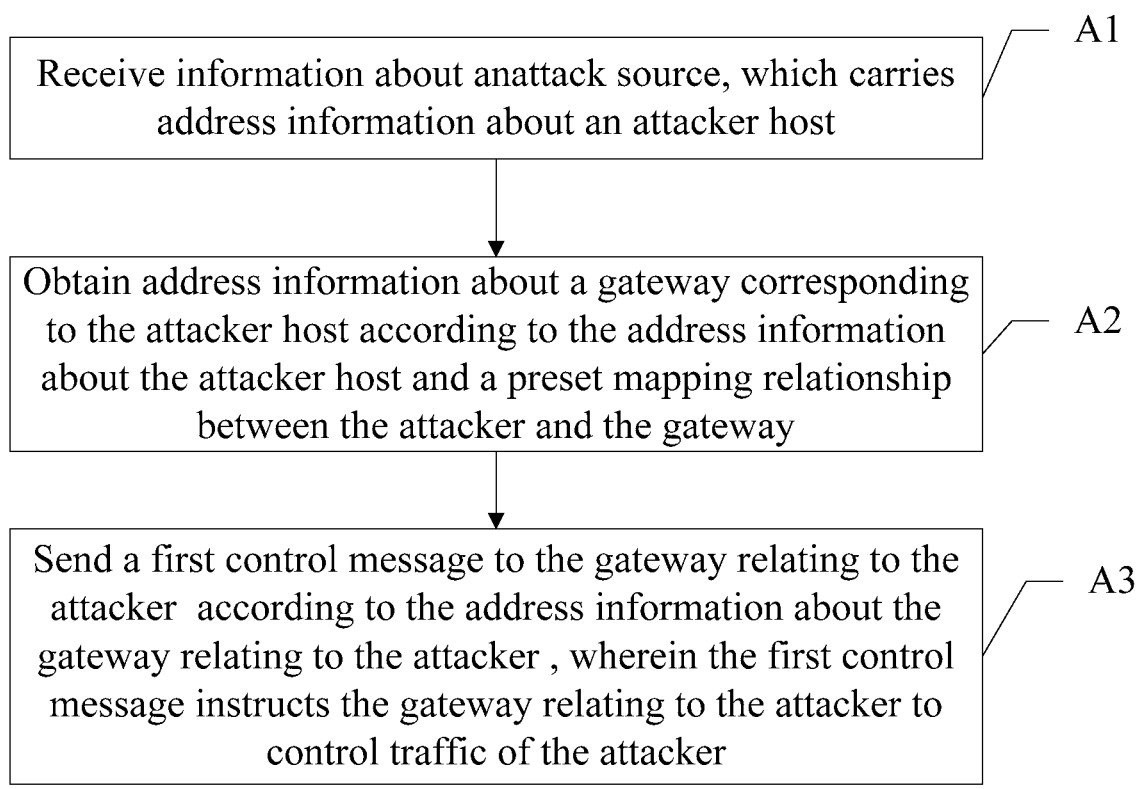
FIG. 1 is a flowchart of a method for network attack protection provided in a first embodiment of the present invention.

FIG. 1 is a flowchart of a method for network attack protection provided in a first embodiment of the present invention. The method for network attack protection provided in the embodiment of the present invention can include:

A1: Receive information about an attack source, in which the information about the attack source carries address information about an attacker.

Specifically, in the embodiment of the present invention, information about an attack source which is sent by a device for detecting a network attack, such as a DDOS cleaning device, is received. The information about the attack source carries address information about the attacker, for example, an Internet protocol (IP, Internet Protocol) address of the attacker or other information that can identify a network host.

A2: Obtain address information about a gateway corresponding to the attacker according to the address information about the attacker and a preset mapping relationship between the attacker and the gateway.

Specifically, in the embodiment of the present invention, the preset mapping relationship between the attacker and the gateway that controls the attacker is queried according to the address information about the attacker to obtain the address information about the gateway corresponding to the attacker. The gateway can control network traffic of the attacker. A certain attacker can be controlled by a plurality of gateways. That is, address information about the gateway corresponding to the attacker may be addresses of multiple gateways.

A3: Send a first control message to the gateway corresponding to the attacker according to the address information about the gateway corresponding to the attacker, in which the first control message instructs the gateway corresponding to the attacker to control traffic of the attacker.

Specifically, in the embodiment of the present invention, the first control message is sent to the gateway corresponding to the attacker according to the address information about the gateway corresponding to the attacker. The first control message carries the address information about the attacker. The first control message instructs the gateway corresponding to the attacker to control traffic of the attacker. After receiving the first control message, the gateway corresponding to the attacker controls the traffic of the attacker according to the address information about the attacker carried in the message, for example, blocks network traffic of the attacker or isolates the attacker or prohibits the traffic of the attacker.

In the embodiment of the present invention, the first control message is sent to the gateway corresponding to the attacker, so that the gateway can control the traffic of the attacker according to the message and prohibit the attacker from receiving or sending data, and therefore, the attacker is prevented from attacking victim hosts on the network from the root and blockage on the upstream network of the victim hosts is avoided, thereby saving network resources, and improving utilization efficiency of the network.

Figure 2:
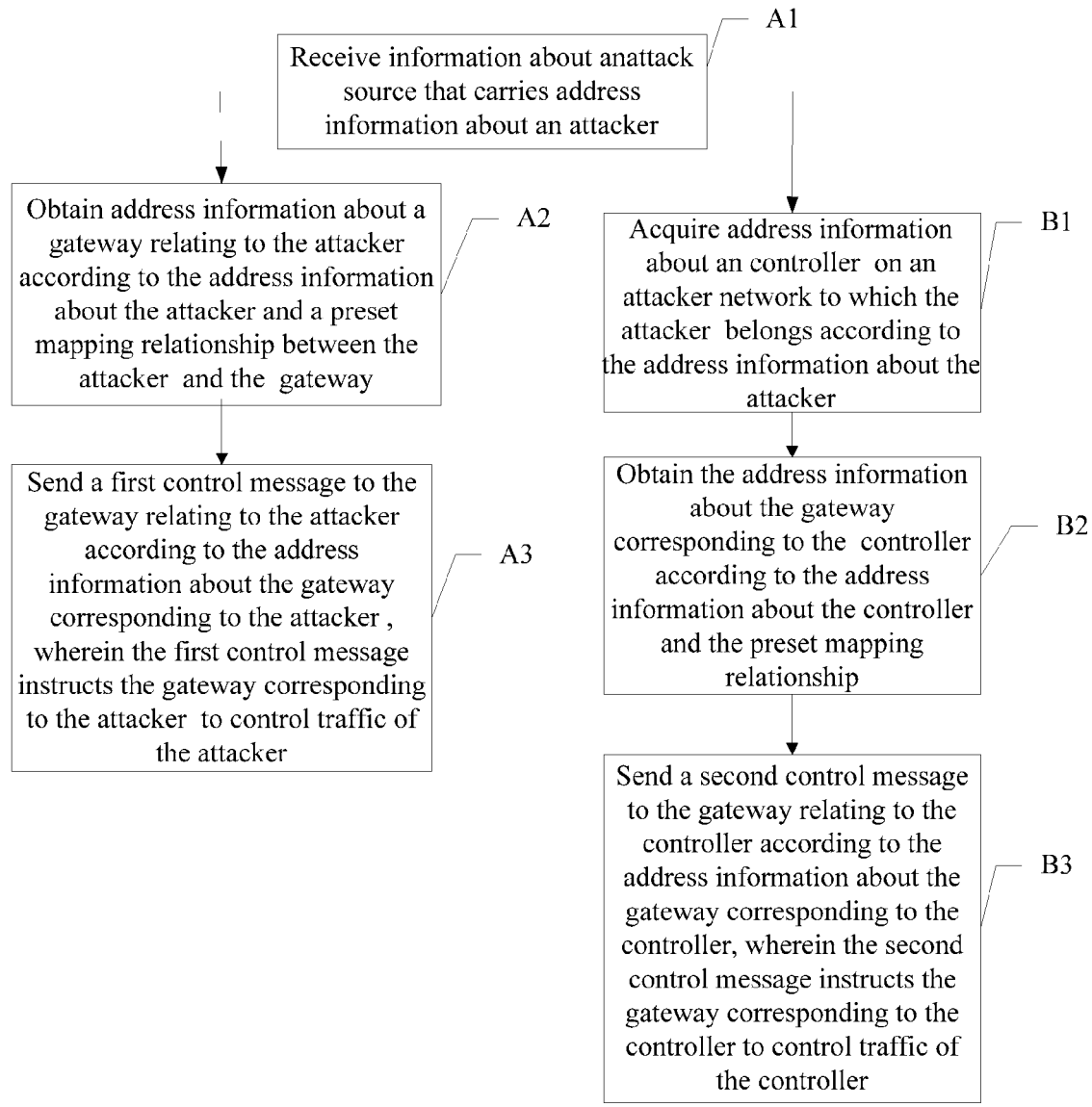
FIG. 2 is a flowchart of a method for network attack protection provided in a second embodiment of the present invention.

FIG. 2 is a flowchart of a method for network attack protection provided in a second embodiment of the present invention.

In the embodiment of the present invention, traffic control may be implemented on an attacker and a controller according to attack source information. Specifically, the following steps may be included on the basis of the first embodiment:

B1: Obtain address information about a controller on an attacker network to which the attacker belongs according to the address information about the attacker.

Specifically, in the embodiment of the present invention, an attacker network detected by a system for detecting an attacker network is queried according to the address information about the attacker, thereby obtaining the address information about the controller on the attacker network to which the attacker belongs. The attacker network may be a botnet or a bounce-attack network.

B2: Obtain address information about a gateway corresponding to the controller according to the address information about the controller and a preset mapping relationship between the controller and the gateway.

Specifically, in the embodiment of the present invention, a preset mapping relationship between a controller and a gateway is queried according to the address information about the controller to obtain the address information about the gateway corresponding to the controller. The gateway can control network traffic of the controller. A certain controller may be controlled by a plurality of gateways. In addition, the attacker and controller can correspond to a same gateway.

B3: Send a second control message to the gateway corresponding to the controller according to the address information about the gateway corresponding to the controller, in which the second control message instructs the gateway corresponding to the controller to control traffic of the controller.

Specifically, in the embodiment of the present invention, the second control message is sent to the gateway corresponding to the controller according to the address information about the gateway corresponding to the controller. The second control message carries the address information about the controller. The second control message instructs the gateway corresponding to the controller to control the traffic of the controller.

After receiving the second control message, the gateway corresponding to the controller controls the traffic of the controller according to the address information about the controller carried in the message, for example, blocks network traffic of the controller or isolates the controller or prohibits the traffic of the controller.

In the embodiment of the present invention, after the information about the attack source is received, the address information about the controller is further queried, and the second control message is sent to the gateway corresponding to the controller, so that the gateway corresponding to the controller can perform traffic control over the controller according to this message and prohibit the controller from receiving or sending data, thereby preventing the controller from sending control instructions to the attacker. This embodiment of the present invention can not only avoid attacks on victim hosts on a network from the attacker, but also block the controller from sending control instructions to the attacker from the control source of the attacker network to which the attacker belongs, thereby preventing the attacker from attacking victim hosts on the network, preventing blockage on the upstream network of the victim hosts, saving network resources, and further improving the network security.

Further, in the embodiment of the present invention, the first control message and/or the second control message can carry control policy information, in which the control policy information may include a blocking duration, a blocking protocol type, or an action mode. In this case, after receiving the first control message or second control message, the gateway performs blocking control over the attacker or controller according to a control policy, for example, prohibits the blocking time, and prohibits the blocking protocol type, such as a transmission control protocol or a user datagram protocol. In addition, the control policy information may include information such as a port number of the attacker or controller. The gateway controls traffic of the port according to the port number of the attacker or controller.

Compared with the preceding embodiment in which the first control message and second control message carry only the address information about the attacker or controller, the present embodiment can more accurately block the attacker from sending attack messages to a network, or block the controller from sending control instructions to the attacker, thereby blocking network attack behavior while ensuring normal communications of the attacker or controller, improving efficiency of protection against network attacks, and improving the service experience of users on the attacker or controller.

Figure 3:
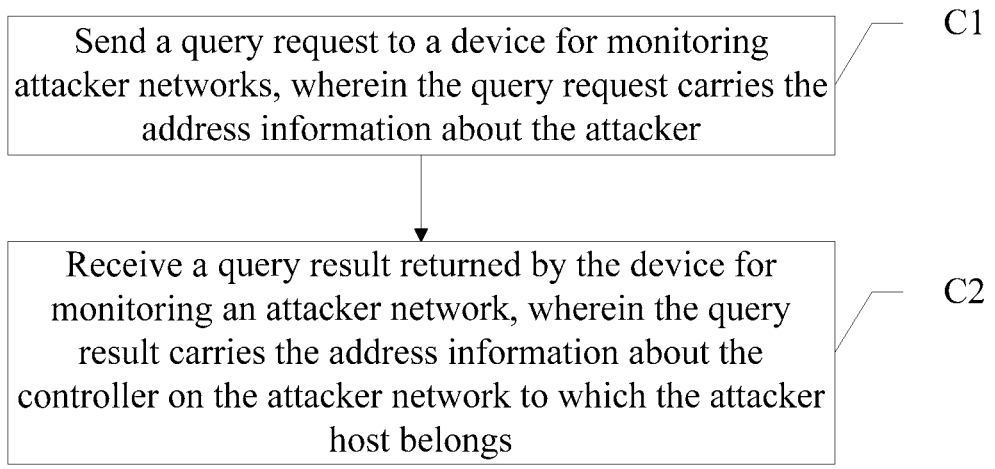
FIG. 3 is a flowchart of a method for obtaining address information about a controller in the method for network attack protection provided in the second embodiment of the present invention.

FIG. 3 is a flowchart of a method for obtaining address information about a controller in the method for network attack protection provided in the second embodiment of the present invention.

In this embodiment of the present invention, the step of obtaining the address information about the controller on the attacker network can include:

C1: Send a query request to a device for monitoring an attacker network, in which the query request carries the address information about the attacker.

Specifically, this embodiment of the present invention can send the query request to the device for monitoring an attacker network, in which the query request carries the address information about the attacker.

The device for monitoring an attacker network can combine detection results about attacker networks detected by each of the existing systems for detecting an attacker network, thereby obtain the address information about the controller on the attacker network or about one or more other attackers on the attacker network, and return a query result.

C2: Receive the query result returned by the device for monitoring an attacker network, in which the query result carries the address information about the controller on the attacker network to which the attacker belongs.

Specifically, in this embodiment of the present invention, the query result returned by the device for monitoring an attacker network is received. The query result carries the address information about the controller on the attacker network to which the attacker belongs. The address information about the controller is obtained and traffic of these controllers is controlled.

In embodiments of the present invention, a plurality of gateways may be obtained by querying the preset mapping relationships between attackers and gateways according to the address information about a certain attacker. That is, a certain attacker may be controlled by a plurality of gateways at the same time. In this case, the step (step A3) of sending the first control message to the gateway corresponding to the attacker according to the address information about the gateway corresponding to the attacker can include: sending the first control message to a gateway with the shortest network path from the attacker according to the address information about the gateway corresponding to the attacker.

In this embodiment of the present invention, the first control message is sent to the gateway with the shortest network path from the attacker, so that the gateway nearest the attacker can receive the first control message, thereby quickly controlling network traffic of the attacker. Therefore, this embodiment can better protect against network attacks and improve the efficiency of protection against network attacks.

It should be noted that, in this embodiment of the present invention, a second control message may be sent to the gateway with the shortest network path from the controller according to the address information about the gateway corresponding to the controller, so that the gateway nearest the controller can receive the second control message, thereby quickly controlling network traffic of the controller, better protecting against network attacks, and improving the efficiency of protection against network attacks.

Figure 4:
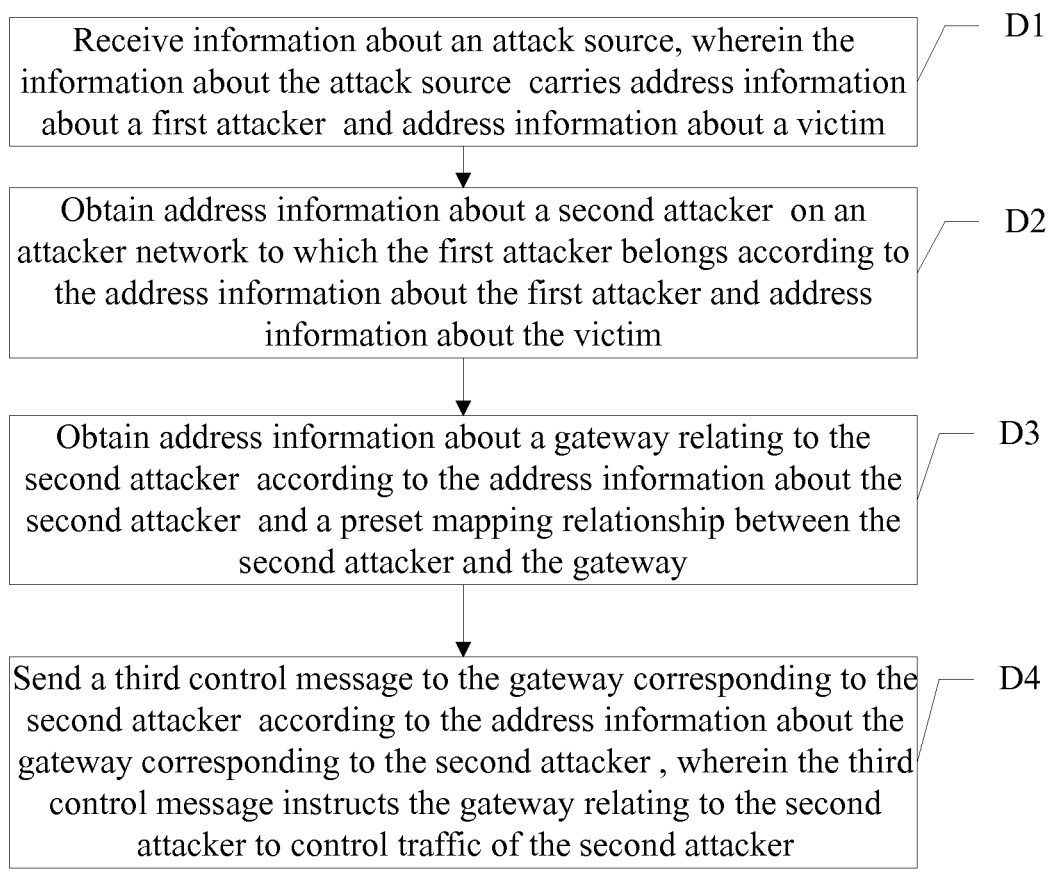
FIG. 4 is a flowchart of a method for network attack protection provided in a third embodiment of the present invention.

FIG. 4 is a flowchart of a method for network attack protection provided in a third embodiment of the present invention. The method for network attack protection provided in this embodiment of the present invention can include:

D1: Receive information about an attack source, in which the information about the attack source carries address information about a first attacker and the address information about a victim.

Specifically, in this embodiment, the information about the attack source sent by the device for detecting a network attack is received. The information about the attack source carries the address information about the first attacker and the address information about the victim host, for example, an Internet protocol address of a host or other information that can identify a network host.

D2: Obtain address information about a second attacker on an attacker network to which the first attacker belongs according to the address information about the first attacker and the address information about the victim host.

Specifically, in this embodiment, the device for monitoring an attacker network is queried according to the address information about the first attacker and the address information about the victim host to obtain the address information about the second attacker on the attacker network to which the first attacker belongs. Certainly, other methods may be used to obtain the address information about the second attacker.

D3: Obtain address information about a gateway corresponding to the second attacker according to the address information about the second attacker and a preset mapping relationship between the second attacker and the gateway.

Specifically, in the embodiment of the present invention, according to the address information about the second attacker, the preset mapping relationship between the host and the gateway that controls the second attacker is queried to obtain the address information about the gateway corresponding to the second attacker. The gateway can control network traffic of the relevant attacker. A same attacker may be controlled by a plurality of gateways.

D4: Send a third control message to the gateway corresponding to the second attacker according to the address information about the gateway corresponding to the second attacker, in which the third control message instructs the gateway corresponding to the second attacker to control traffic of the second attacker.

Specifically, in this embodiment, the third control message is sent to the second attacker. The third control message carries the address information about the second attacker, and instructs the gateway corresponding to the second attacker to control the traffic of the second attacker.

After receiving the third control message, the gateway corresponding to the second attacker controls the traffic of the second attacker corresponding to the address information about the second attacker carried in the message, for example, blocks network traffic of the second attacker or isolates the second attacker or prohibits the traffic of the second attacker.

In this embodiment of the present invention, the third control message is sent to the gateway corresponding to the second attacker, so that the gateway can control traffic on the second attacker according to this message, and prohibit the second attacker from receiving or sending data, thereby preventing the second attacker from attacking the victim host on the network. Compared with the first embodiment, the method for network attack protection in this embodiment of the present invention can obtain the address information about one or more other attackers on the attacker network in a more full-round manner, thereby controlling the traffic of attackers on the network, can more efficiently protect against network attacks, and can improve the network utilization efficiency.

When obtaining the address information about the second attacker, in this embodiment of the present invention, the same method for obtaining the controller in the first embodiment can also be used, that is, sending a query request that carries the address information about the first attacker and victim host to the device for monitoring a network attack, in which the device for monitoring a network attack obtains address information about other attacker (that is, the second attacker) on the attacker network according to the query request and returns the relevant query result. In this embodiment, the address information about the second attacker is obtained according to the query result returned by the device for monitoring a network attack, thereby controlling traffic of the second attacker.

When sending the third control message to the gateway corresponding to the second attacker in the third embodiment, the third control message can be sent to the gateway with the shortest network path from the second attacker according to the address information about the gateway corresponding to the second attacker, thereby quickly controlling network traffic of the attacker and improving the efficiency of protection against network attacks.

Figure 5:
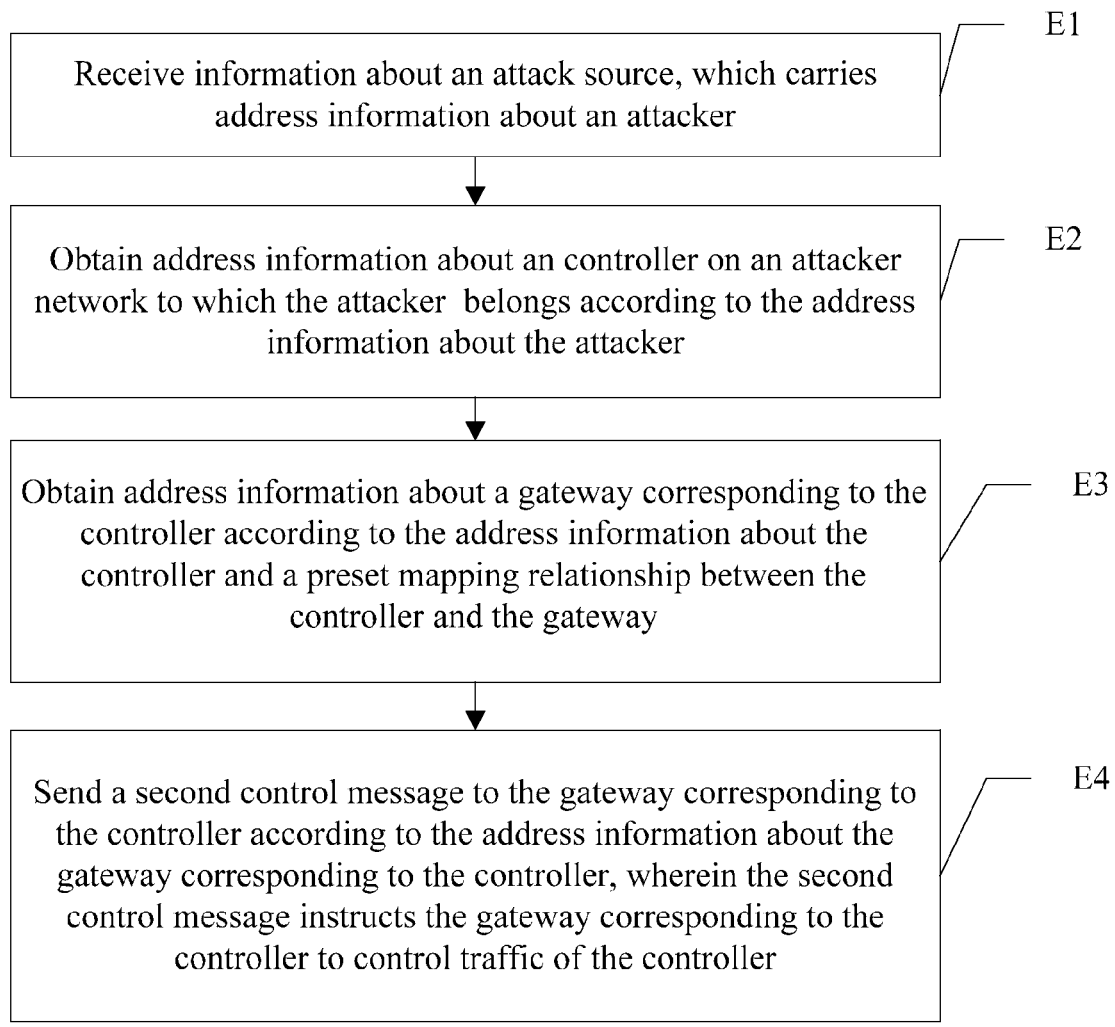
FIG. 5 is a flowchart of a method for network attack protection provided in a fourth embodiment of the present invention.

FIG. 5 is a flowchart of a method for network attack protection provided in a fourth embodiment of the present invention. The method for network attack protection provided in this embodiment method includes:

E1: Receive information about an attack source, in which the information about the attack source carries address information about an attacker.

Specifically, in the embodiment of the present invention, information about an attack source sent by a device for detecting a network attack, such as a DDOS cleaning device, is received. The information about the attack source carries address information about the attacker, for example, an Internet protocol address of the attacker or other information that can identify the attacker.

E2: Obtain address information about a controller on an attacker network to which the attacker belongs according to the address information about the attacker.

Specifically, in the embodiment of the present invention, according to the address information about the attacker, an attacker network detected by a system for detecting an attacker network is queried to obtain the address information about the controller on the attacker network to which the attacker belongs. The attacker network may be a botnet or a bounce-attack network.

E3: Obtain address information about a gateway corresponding to the controller according to the address information about the controller and a preset mapping relationship between the controller and the gateway.

Specifically, in this embodiment of the present invention, a preset mapping relationship between the controller and the gateway can be queried according to the address information about the controller to obtain the address information about the gateway corresponding to the controller. The gateway can control network traffic of the relevant controller. A same controller may be controlled by a plurality of gateways. That is, address information about the gateway corresponding to the controller may be a plurality of addresses.

E4: Send a second control message to the gateway corresponding to the controller according to the address information about the gateway corresponding to the controller, in which the second control message instructs the gateway corresponding to the controller to control traffic of the controller.

Specifically, in this embodiment of the present invention, the second control message is sent to the gateway corresponding to the controller according to the address information about the gateway corresponding to the controller. The second control message carries the address information about the controller. The second control message instructs the gateway corresponding to the controller to control the traffic of the controller.

After receiving the second control message, the gateway corresponding to the controller controls the traffic on the controller, for example, blocks the network traffic of the controller or isolates the controller or prohibits the traffic of the controller.

In this embodiment of the present invention, the second control message is sent to the gateway corresponding to the controller, so that the gateway can control the traffic of the controller according to the message and prohibit the controller from sending data, thereby preventing the controller from delivering commands to attackers on the network from the root, prohibiting attackers on the network from attacking victim hosts, avoiding blockage on the upstream network of the victim hosts, saving network resources, and improving utilization efficiency of the network.

In this embodiment of the present invention, the step (that is, step E2) for obtaining the address information about the controller on the attacker to which the attacker belongs according to the address information about the attacker may be the same as the steps (that is, steps C1 and C2) for obtaining the address information about the controller in the first embodiment, and is not repeated here.

The method for network attack protection provided in embodiments of the present invention is described above in detail. Embodiments of the present invention further provide embodiments about a device for network attack protection corresponding to the preceding method embodiments and a relevant system for network attack protection.

Figure 6:
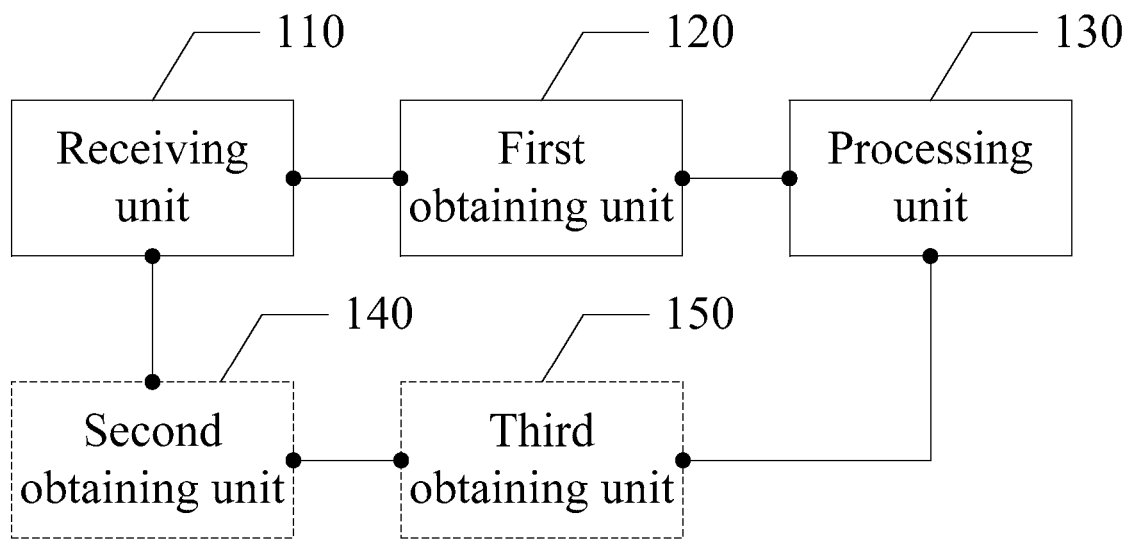
FIG. 6 shows a device for network attack protection provided in a fifth embodiment of the present invention.

FIG. 6 shows a device for network attack protection provided in a fifth embodiment of the present invention.

In this embodiment of the present invention, the device for network attack protection that executes network attack protection can include: a receiving unit 110, configured to receive information about an attack source, in which the information about the attack source carries address information about an attacker; a first obtaining unit 120, configured to obtain address information about a gateway corresponding to the attacker according to the address information about the attacker and a preset mapping relationship between the attacker and the gateway; and a processing unit 130, configured to send a first control message to the gateway corresponding to the attacker according to the address information about the gateway corresponding to the attacker, in which the first control message instructs the gateway corresponding to the attacker to control traffic of the attacker.

The embodiment for the device for network attack protection provided in this embodiment may be used in the first embodiment for the method for network attack protection. In this embodiment of the present invention, the device for network attack protection sends the first control message to the gateway corresponding to the controller, so that the gateway can control the traffic of the attacker according to the message and prohibit the attacker from receiving or sending data, thereby preventing the attacker from attacking victim hosts on the network from the root, avoiding blockage on the upstream network of the victim hosts, saving network resources, and improving utilization efficiency of the network.

In this embodiment, the device for network attack protection can further include: a second obtaining unit 140, configured to obtain address information about a controller on an attacker network to which the attacker belongs according to the address information about the attacker received by the receiving unit 110; and a third obtaining unit 150, configured to obtain address information about a gateway corresponding to the controller according to the address information about the controller and a preset mapping relationship between the controller and the gateway; in which, the processing unit 130 can further be configured to send a second control message to the gateway corresponding to the controller according to the address information about the gateway corresponding to the controller, in which the second control message instructs the gateway corresponding to the controller to control traffic of the controller.

By adding the second obtaining unit 140 and third obtaining unit 150, the device for network attack protection provided in this embodiment of the present invention may further control the traffic of the controller corresponding to the attacker, thereby preventing the controller from sending control instructions to the attacker to instruct the attacker to attack victim hosts on the network, and further improving the efficiency of protection against network attacks.

Further, the processing unit 130 can send a first control message to the gateway with the shortest network path from the attacker according to the address information about the gateway corresponding to the attacker, so that the relevant gateway quickly controls traffic of the attacker. The processing unit 130 can further send a second control message to the gateway with the shortest network path from the controller according to the address information about the gateway corresponding to the controller, so that the relevant gateway quickly controls traffic of the controller, further improving the efficiency of protection against network attacks.

Figure 7:
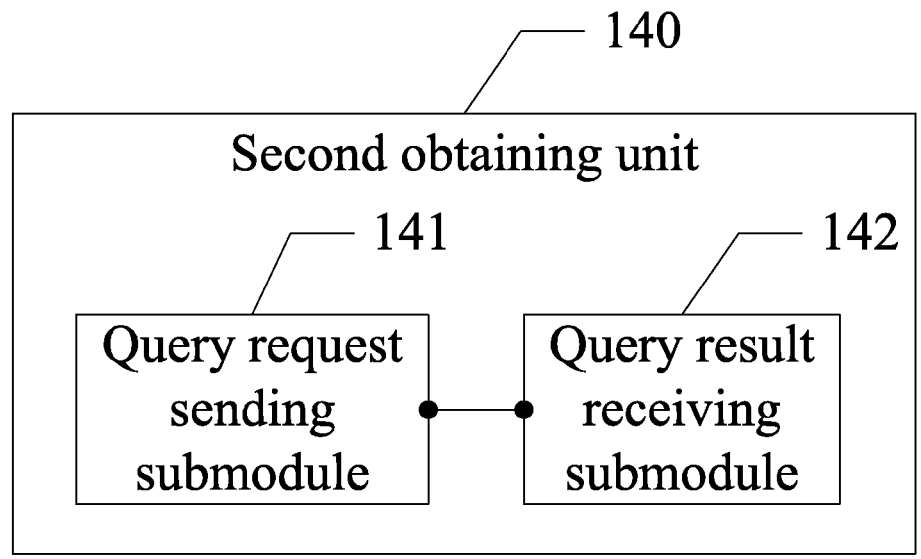
FIG. 7 shows a second obtaining device in the device for network attack protection provided in the fifth embodiment of the present invention.

FIG. 7 shows a second obtaining unit in the device for network attack protection provided in the fifth embodiment of the present invention.

In the preceding embodiment for the device for network attack protection, the second obtaining unit 140 can include: a query request sending submodule 141, configured to send a query request to a device for monitoring an attacker network, in which the query request carries the address information about the attacker; and a query result receiving submodule 142, configured to receive a query result returned by the device for monitoring an attacker network, in which the query result carries the address information about the controller on the attacker network to which the attacker belongs.

In this embodiment of the present invention, the second obtaining unit 140 can obtain the address information about the controller by sending the query request to the device for monitoring an attacker network, thereby performing blocking control over the controller.

Figure 8:
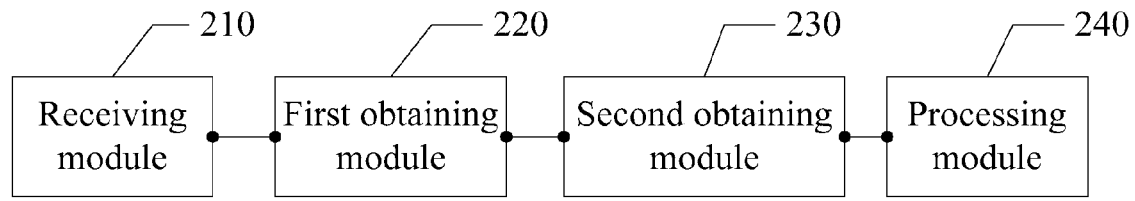
FIG. 8 shows a device for network attack protection provided in a sixth embodiment of the present invention.

FIG. 8 shows a device for network attack protection provided in a sixth embodiment of the present invention.

In this embodiment of the present invention, the device for network attack protection includes: a receiving module 210, configured to receive information about an attack source, in which the information about the attack source carries address information about an attacker; a first obtaining module 220, configured to obtain address information about a controller on an attacker network to which the attacker belongs according to the address information about the attacker received by the receiving module 210; a second obtaining module 230, configured to obtain address information about a gateway corresponding to the controller according to the address information about the controller and a preset mapping relationship between the controller and the gateway; and a processing unit 240, configured to send a second control message to the gateway corresponding to the controller according to the address information about the gateway corresponding to the controller, in which the second control message instructs the gateway corresponding to the controller to control traffic of the controller.

In this embodiment of the present invention, the second control message is sent to the gateway corresponding to the controller, so that the gateway can control the traffic of the controller according to the message and prohibit the controller from sending data, thereby preventing the controller from delivering commands to attackers on the network from the root, efficiently prohibiting the attackers on the network from attacking victim hosts, avoiding blockage on the upstream network of the victim hosts, saving network resources, and improving utilization efficiency of the network.

Figure 9:
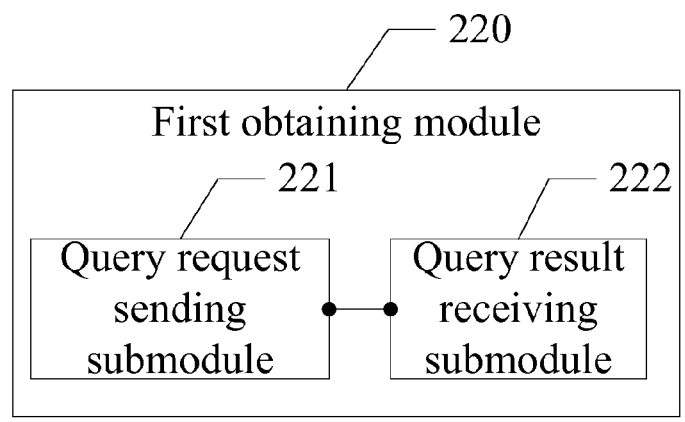
FIG. 9 shows a first obtaining module in the device for network attack protection provided in the sixth embodiment of the present invention.

FIG. 9 shows the first obtaining module in the device for network attack protection provided in the sixth embodiment of the present invention.

In this embodiment of the present invention, the first obtaining module 220 in the device for network attack protection can include: a query request sending submodule 221, configured to send a query request to a device for monitoring an attacker network, in which the query request carries the address information about the attacker; and a query result receiving submodule 222, configured to receive a query result returned by the device for monitoring an attacker network, in which the query result carries the address information about the controller on the attacker network to which the attacker belongs.

In this embodiment of the present invention, the first obtaining unit 220 can obtain the address information about the controller by sending the query request to the device for monitoring an attacker network, thereby performing blocking control over the controller.

Figure 10:
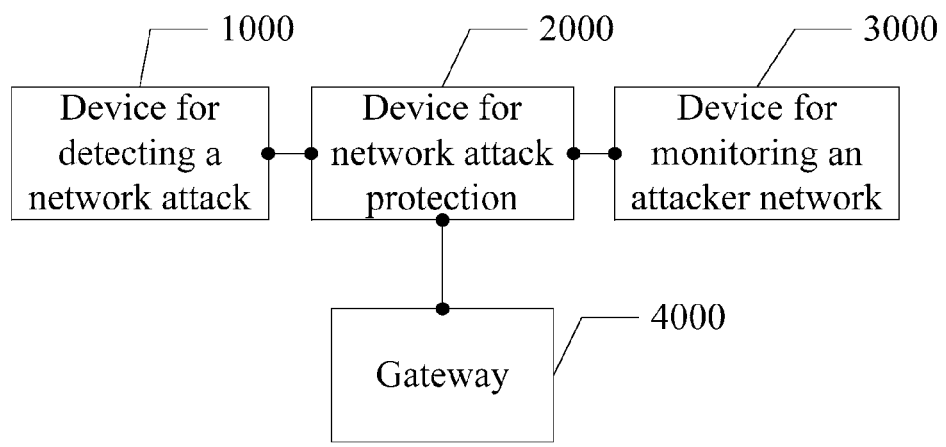
FIG. 10 shows a system for network attack protection provided in a seventh embodiment of the present invention.

FIG. 10 shows a system for network attack protection provided in a seventh embodiment of the present invention.

A system for network attack protection is further provided in an embodiment of the present invention, including a device for detecting a network attack 1000, a device for network attack protection 2000, a device for monitoring an attacker network 3000, and a gateway 4000, in which: the device for detecting a network attack 1000 is configured to detect an attack source on a network, and send information about the attack source to the device for network attack protection 2000, in which the information about the attack source carries address information about an attacker; the device for network attack protection 2000 is configured to receive the information about the attack source sent by the device for detecting a network attack 1000, query the device for monitoring a network attack 3000 for address information about a controller on an attacker network to which the attacker belongs according to the information about the attack source, obtain address information about a gateway 4000 corresponding to the controller according to the address information about the controller and a preset mapping relationship between the controller and the gateway, and send a control message to the gateway 4000 corresponding to the controller, in which the control message instructs the gateway 4000 corresponding to the controller to control traffic of the controller; the device for monitoring an attacker network 3000 is configured to receive a query request sent by the device for network attack protection 2000, in which the query request carries the address information about the attacker, and return the address information about the controller on the attacker network to which the attacker belongs to the device for network attack protection 2000; and the gateway 4000 is configured to receive the control message sent by the device for network attack protection 2000 and control the traffic of the controller according to the control message.

The device for detecting a network attack may be a DDOS cleaning device, or a hardware device or detection software program that can detect network attacks.

The system for network attack protection provided in this embodiment can obtain the address information about the controller on the attacker network according to the information about the attack source reported by the device for detecting a network attack, and control traffic of the controller, thereby preventing the controller from delivering commands to attackers on the network from the root, prohibiting the attackers on the network from attacking victim hosts, avoiding blockage on the upstream network of the victim hosts, saving network resources, and improving utilization efficiency of the network.

It should be noted that the content of information exchange and execution process between units of the preceding device is originated from the same idea as the embodiments of the present invention, and the descriptions about the embodiments for the method in the present invention can be referred to for the specific content, which is not repeated here.

Those killed in the art can complete all or part of the steps in the preceding method by using a program to instruct the hardware. The program may be stored in a storage medium that may be read by a computer. The procedure for executing the program can include the flows of the methods provided in an embodiment of the present invention. The storage medium may be disk tape, compact disk, read-only memory (ROM, Read-Only Memory), or random access memory (RAM, Random Access Memory).

Detailed above are a method for network attack protection and a device and system for network attack protection for implementing this method in embodiments of the present invention. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method implemented by a network device for providing network attack protection against distributed denial of service attacks, comprising:

receiving, by the network device, information about an attack source, wherein the information about the attack source carries address information about an attacker, wherein the attacker is controlled by a malicious controller to launch a denial-of-service attack, and the attacker and the malicious controller are separate network entities;

obtaining, by the network device, address information about a gateway corresponding to the attacker according to the address information about the attacker and a preset mapping relationship between the attacker and the gateway corresponding to the attacker;

sending, by the network device, a first control message to the gateway corresponding to the attacker, wherein the first control message instructs the gateway corresponding to the attacker to control traffic of the attacker for preventing upstream network traffic of a victim host of the denial of service attack from being blocked;

obtaining, by the network device, address information about the malicious controller according to the address information about the attacker;

obtaining, by the network device, address information about a gateway corresponding to the malicious controller according to the address information about the malicious controller and a preset mapping relationship between the malicious controller and the gateway corresponding to the malicious controller; and sending, by the network device, a second control message to the gateway corresponding to the malicious controller, wherein the second control message instructs the gateway corresponding to the malicious controller to control traffic of the malicious controller for preventing upstream network traffic of the victim host from being blocked.

2. The method for providing network attack protection against distributed denial of service attacks according to claim 1, wherein:

the information about the attack source carries an attack protocol type or an attacked port number, the first control message and/or the second control message carries control policy information, and the control policy information comprises the attacked port number and/or a protocol type corresponding to the attack protocol type.

3. The method for providing network attack protection against distributed denial of service attacks according to claim 1, wherein in the step of sending the first control message to the gateway corresponding to the attacker, the gateway corresponding to the attacker has a shortest network path from the attacker.

4. The method for providing network attack protection against distributed denial of service attacks according to claim 1, wherein in the step of sending the second control message to the gateway corresponding to the malicious controller, the gateway corresponding to the malicious controller has a shortest network path from the malicious controller.

5. The method for providing network attack protection against distributed denial of service attacks according to claim 1, wherein the step of obtaining address information about the malicious controller on the attacker network to which the attacker belongs comprises:

sending a query request to a device for monitoring the attacker network, wherein the query request carries the address information about the attacker; and receiving a query result returned by the device for monitoring the attacker network, wherein the query result carries the address information about the malicious controller on the attacker network to which the attacker belongs.

6. A device for providing network attack protection against distribution denial of service attacks, comprising:

a processor; and a memory coupled to the processor, wherein the processor is configured to:

receive information about an attack source, wherein the information about the attack source carries address information about an attacker, wherein the attacker is controlled by a malicious controller to launch denial-of-service attacks, and the attacker and the malicious controller are separate network entities;

obtain address information about a gateway corresponding to the attacker according to the address information about the attacker and a preset mapping relationship between the attacker and the gateway corresponding to the attacker;

send a first control message to the gateway corresponding to the attacker according to the address information about the gateway corresponding to the attacker, wherein the first control message instructs the gateway corresponding to the attacker to control traffic of the attacker for preventing upstream network traffic of a victim host of the denial of service attack from being blocked;

obtain address information about the malicious controller according to the address information about the attacker received by the first receiving unit;

obtain address information about a gateway corresponding to the malicious controller according to the address information about the malicious controller and a preset mapping relationship between the malicious controller and the gateway corresponding to the malicious controller; and send a second control message to the gateway corresponding to the malicious controller, wherein the second control message instructs the gateway corresponding to the malicious controller to control traffic of the malicious controller for preventing upstream network traffic of the victim host from being blocked.

7. The device for providing network attack protection against distributed denial of service attacks according to claim 6, wherein:

the information about the attack source carries an attack protocol type or an attacked port number, the first control message and/or the second control message carries control policy information, and the control policy information comprises the attacked port number and/or a protocol type corresponding to the attack protocol type.

8. The device for providing network attack protection against distributed denial of service attacks according to claim 6, wherein:

the gateway corresponding to the malicious controller has a shortest network path from the attacker.

9. The device for providing network attack protection against distributed denial of service attacks according to claim 6, wherein the processor is configured to:

send a query request to a device for monitoring the attacker network, wherein the query request carries the address information about the attacker; and receive a query result returned by the device for monitoring the attacker network, wherein the query result carries the address information about the malicious controller on the attacker network to which the attacker belongs.

10. The device for providing network attack protection against distributed denial of service attacks according to claim 6, wherein:

the gateway corresponding to the malicious controller has a shortest network path from the malicious controller.

11. A system for providing network attack protection against distributed denial of service attacks, comprising:

a first device comprising a non-transitory storage medium with executable instructions for detecting a network attack;

a second device comprising a non-transitory storage medium with executable instructions for network attack protection;

a third device comprising a non-transitory storage medium with executable instructions for monitoring an attacker network; and a gateway, wherein:

the first device for detecting a network attack is configured to detect an attack source on a network and send information about the attack source to the second device for network attack protection, wherein the information about the attack source carries address information about an attacker;

the second device for network attack protection is configured to receive the information about the attack source sent by the first device for detecting a network attack, query the third device for monitoring an attacker network attack for address information about a malicious controller on an attacker network to which the attacker belongs according to the information about the attack source, wherein the attacker is controlled by the malicious controller to launch denial-of-service attacks; obtain address information about the gateway, which corresponds to the malicious controller, according to the address information about the malicious controller and a preset mapping relationship between the malicious controller and the gateway, and send a control message to the gateway corresponding to the malicious controller, the control message instructs the gateway corresponding to the malicious controller to control traffic of the malicious controller;

the third device for monitoring an attacker network is configured to receive a query request sent by the second device for network attack protection, wherein the query request carries the address information about the attacker, and return the address information about the malicious controller on the attacker network to which the attacker belongs to the second device for network attack protection; and the gateway is configured to receive the control message sent by the second device for network attack protection and control the traffic of the malicious controller according to the control message for preventing upstream network traffic of a victim host from being blocked.

12. The system for providing network attack protection against distributed denial of service attacks according to claim 11, wherein:

the information about the attack source carries an attack protocol type or an attacked port number, the control message carries control policy information, and the control policy information comprises the attacked port number and/or a protocol type corresponding to the attack protocol type.

13. The system for providing network attack protection against distributed denial of service attacks according to claim 11, wherein:

the second device for network attack protection is configured to select a gateway having a shortest network path from the malicious controller as the gateway corresponding to the malicious controller.

\* \* \* \* \*

UNITED STATES PATENT AND TRADEMARK OFFICE
CERTIFICATE OF CORRECTION

| | | |
|---|---|---|
| PATENT NO. | : 9,088,607 B2 | Page 1 of 1 |
| APPLICATION NO. | : 13/488128 | |
| DATED | : July 21, 2015 | |
| INVENTOR(S) | : Wu Jiang | |

It is certified that error appears in the above-identified patent and that said Letters Patent is hereby corrected as shown below:

In the Claims

Column 15, line 28, "attack" should be deleted.

Signed and Sealed this
Twenty-ninth Day of December, 2015

Michelle K. Lee
*Director of the United States Patent and Trademark Office*